(12) United States Patent
Fraenkel et al.

(10) Patent No.: US 8,700,018 B2
(45) Date of Patent: Apr. 15, 2014

(54) METHOD AND APPARATUS FOR ADAPTING A TELEPHONY COMPONENT TO OPERATE IN A DIFFERENT TELEPHONY

(75) Inventors: Avraham Fraenkel, Nof Ayalon (IL); Pavan Kumar Oruganti, Vijayawada (IN); Zvi Kleiner, Herzlia (IL)

(73) Assignee: DSP Group Ltd., Herzeliya (IL)

( * ) Notice: Subject to any disclaimer, the term of this patent is extended or adjusted under 35 U.S.C. 154(b) by 0 days.

(21) Appl. No.: 13/383,210

(22) PCT Filed: Apr. 13, 2011

(86) PCT No.: PCT/IL2011/000303
§ 371 (c)(1),
(2), (4) Date: Mar. 19, 2012

(87) PCT Pub. No.: WO2012/140640
PCT Pub. Date: Oct. 18, 2012

(65) Prior Publication Data
US 2012/0264411 A1    Oct. 18, 2012

(51) Int. Cl.
*H04M 3/42* (2006.01)
(52) U.S. Cl.
USPC ............ 455/416; 455/426.1; 455/426.2; 455/432.1; 455/550.1; 455/553.1; 455/556.1; 370/277; 370/338
(58) Field of Classification Search
USPC ............ 455/416, 426.1, 426.2, 432.1, 550.1, 455/553.1, 556.1, 277, 338; 370/277, 338
See application file for complete search history.

(56) References Cited

U.S. PATENT DOCUMENTS

| | | | |
|---|---|---|---|
| 7,960,945 B1* | 6/2011 | Onorato et al. | 320/132 |
| 2009/0104913 A1* | 4/2009 | Karls et al. | 455/450 |
| 2010/0159898 A1* | 6/2010 | Krzyzanowski et al. | 455/414.1 |
| 2011/0086630 A1* | 4/2011 | Manssen et al. | 455/419 |
| 2011/0215966 A1* | 9/2011 | Kim et al. | 342/357.29 |

OTHER PUBLICATIONS

K. H. Mueller: "The New Generation of Home Phones with Android OS", CAT-iq Developers Conference 2010, Oct. 20, 2010, pp. 1-42, XP002664860, Retrived from the Internet: URL: http://cat-iqconference.com/files/2010/10/CCT_KH_Muller.pdf.
K. H. Mueller: "The New Generation of Home Phones with Android OS", CAT-iq Developers Conference 2010 , Oct. 20, 2010, pp. 1-42, XP002664860, Retrieved from the Internet: URL:http://cat-iqconference.com/files/2010/10/CCT_KH_Muller.pdf [retrieved on Dec. 1, 2011].

* cited by examiner

*Primary Examiner* — Amancio Gonzalez
(74) *Attorney, Agent, or Firm* — Oren Reches

(57) ABSTRACT

A method for modifying an application framework devised for network-based telephony to operate in a local telephony, comprising adapting the application framework to interact with a communication device operable cooperatively with a local base, and emulating a functionally of the network related to the application framework according to an operation of the local base, at least partially, and an apparatus for using the modified application framework.

30 Claims, 4 Drawing Sheets

PRIOR ART

METHOD AND APPARATUS FOR ADAPTING A TELEPHONY COMPONENT TO OPERATE IN A DIFFERENT TELEPHONY

BACKGROUND

The present disclosure generally relates to telephony, and more specifically to adaptation between different telephonies.

Home wireless handsets operating via a base connected to a PSTN outlet are well known in numerous residencies. Generally, handsets of different manufacturers operating in various frequencies and coding methods were incompatible with each other.

The introduction of the DECT standard (Digital Enhanced Cordless Telecommunications) enabled interchanging of equipment conforming to the standard irrespective of the manufacturer.

Similarly, GSM (Global System for Mobile Communications) standard allows interchanging equipment that conformed to the standard, allowing also interchanging SIM (subscriber identity module) between handsets conforming to the GSM standard.

Some differences between a DECT handset and a GSM handset are:
Lack of SIM
Operation via a local base
Lack of data application respective to a network, but rather only respective to the local base
Types of call such as External call, Intercom, Page, telephone answering device (TAD)
Base settings, Phone Book synchronization and SMS are done via the DECT towards the base
Multi-Line
Optional Voice-Over-IP (VoIP) calls.

SUMMARY

One exemplary embodiment of the disclosed subject matter is a method for modifying an application framework devised for a network-based telephony to operate in a local telephony, comprising adapting the application framework to interact with a communication device operable cooperatively with a local base, and emulating a functionally of the network related to the application framework according to an operation of the local base, at least partially.

Another exemplary embodiment of the disclosed subject matter is an apparatus for a local telephony, comprising an at least a part of a local handset employing an application framework devised for network-based telephony and adapted to interact with a local base. Optionally, the at least a part of the local handset further comprises also a network device operable in a network and wherein the application framework interacts also with the network device. Optionally, the network device is a cellular device operable in a cellular network.

Another exemplary embodiment of the disclosed subject matter is a kit comprising a local communication device enabling cooperative communications with a local base, and an application framework devised for network-based telephony and adapted to interact with the local base by the local communication device. Optionally, the application framework maintains the functionality of operation with a cellular device such as a cellular communications or network device.

Yet another exemplary embodiment of the disclosed subject matter is a kit comprising an application framework devised for network-based telephony and adapted to operate in a local telephony wherein the kit is optionally provided as an at least one of a computer readable medium or a reference for downloading from a remote storage apparatus.

Definitions and/or explanations of terms used herein are provided below.

BRIEF DESCRIPTION OF THE DRAWINGS

Some non-limiting exemplary embodiments or features of the disclosed subject matter are illustrated in the following drawings.

Identical or duplicate or equivalent or similar structures, elements, or parts that appear in one or more drawings are generally labeled with the same reference numeral, optionally with an additional letter or letters to distinguish between similar objects or variants of objects, and may not be repeatedly labeled and/or described.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

Figure 1A:
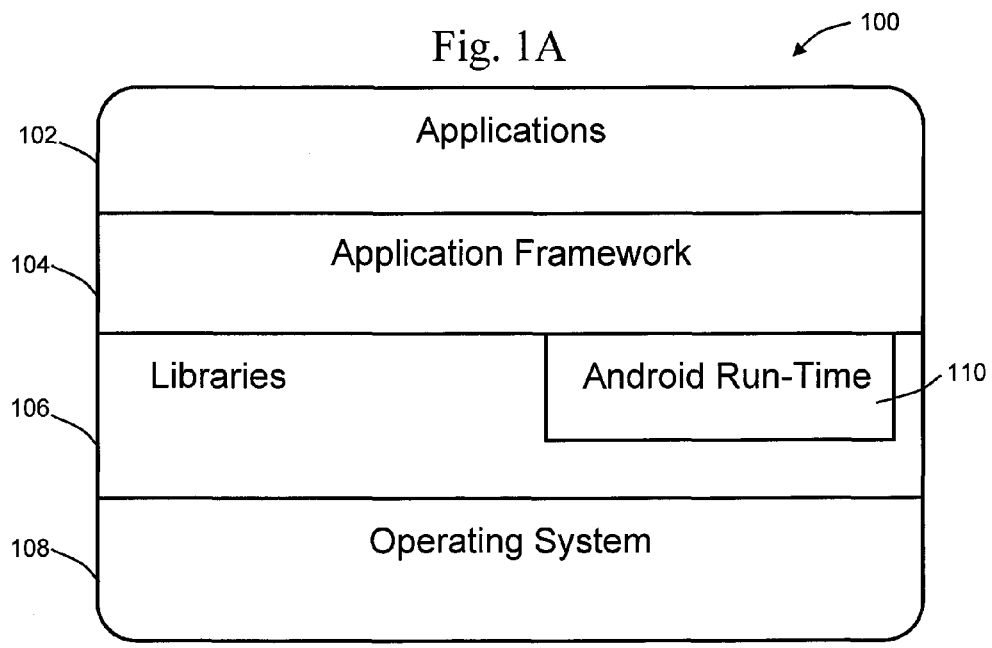
Figure 1B:
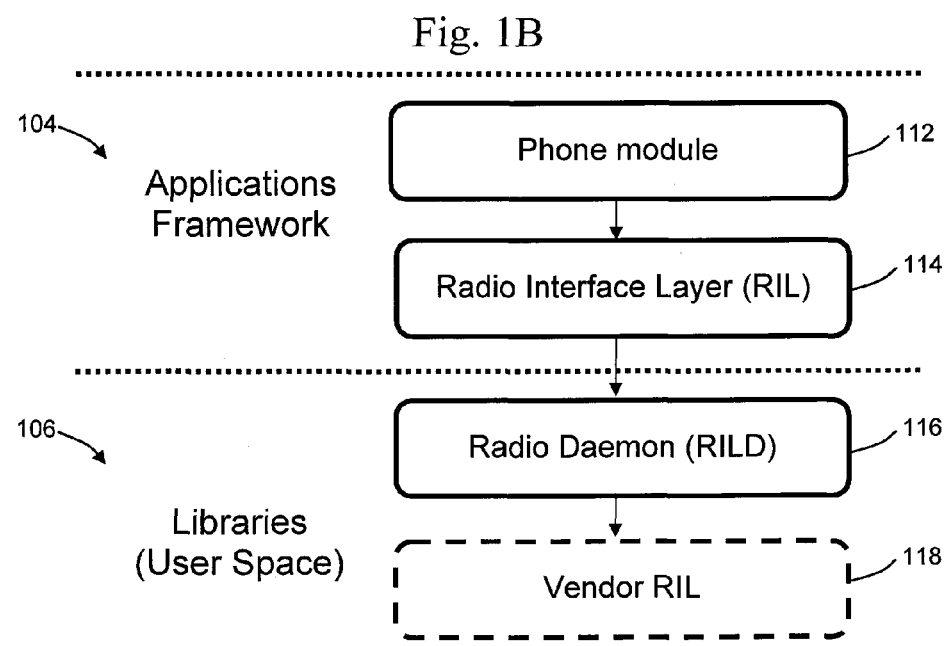
Figure 2:
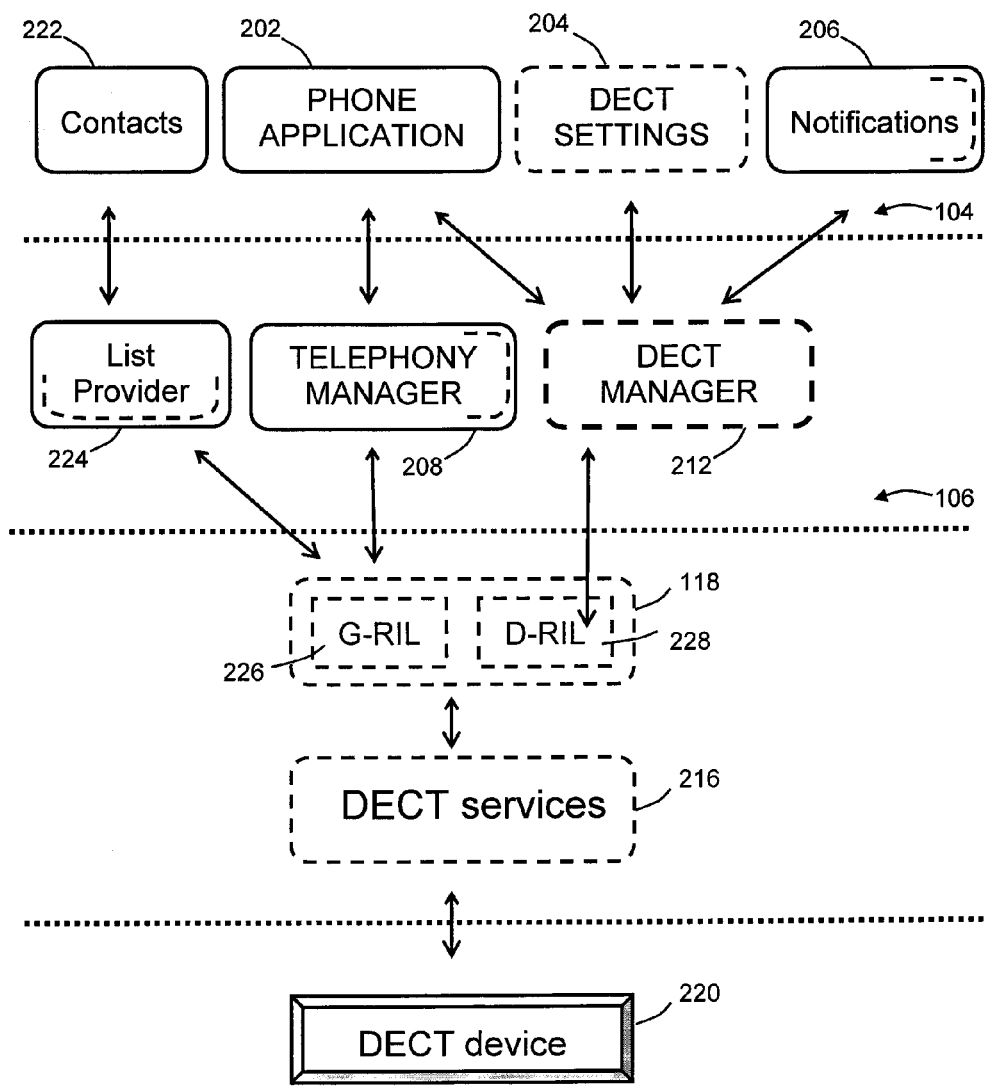
Figure 3:
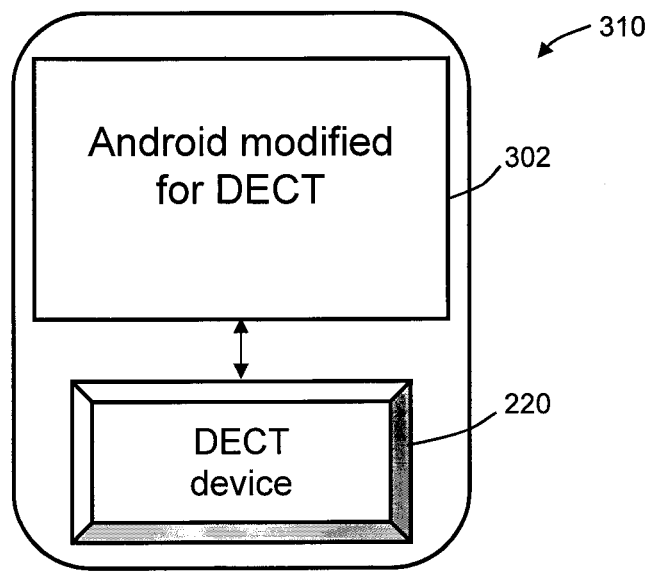
Figure 4:
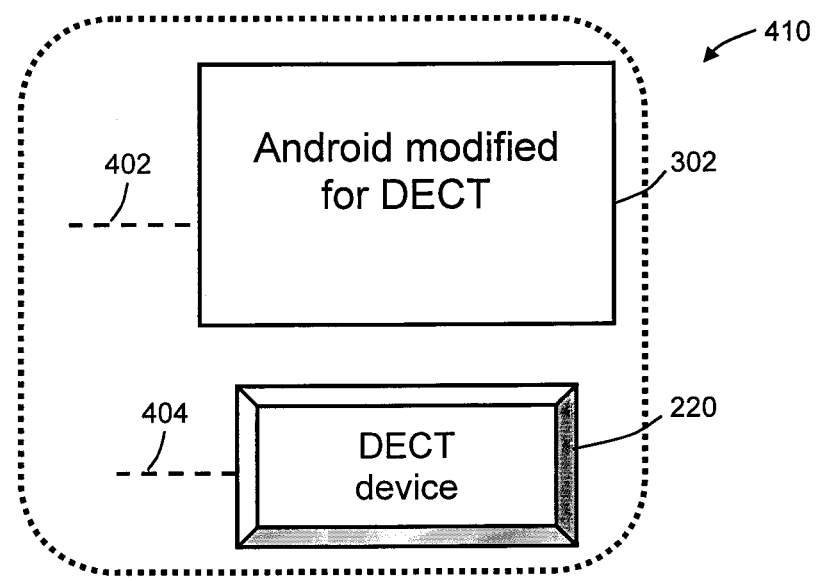
Figure 5:
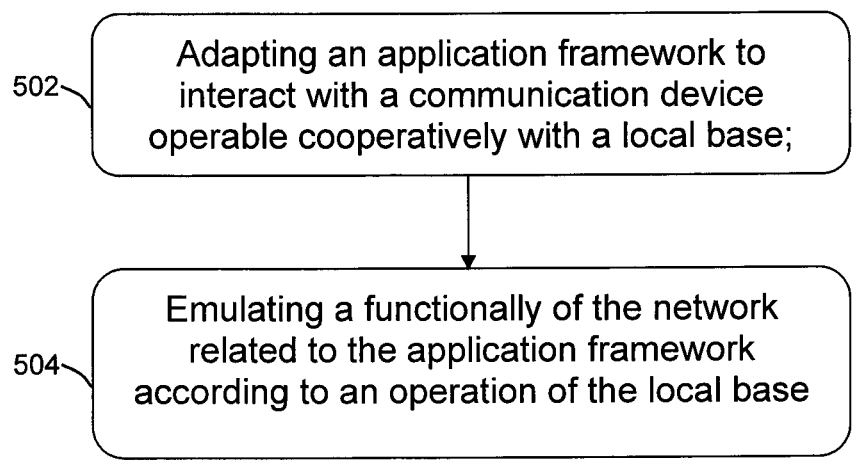

FIG. 1A schematically illustrates a hierarchy block diagram of Android;

FIG. 1B schematically illustrates a partial block diagram and basic control sequence of Android for phone operations;

FIG. 2 schematically illustrates a part of Android with some of the elements used in adaptation of Android and relations therebetween, according to exemplary embodiments of the disclosed subject matter;

FIG. 3 schematically illustrates a local handset or part thereof comprising a local communication device and an application framework modified to operate with the local communication device, according to exemplary embodiments of the disclosed subject matter;

FIG. 4 schematically illustrates a kit comprising a local communication device and an application framework modified to operate with the local communication device, according to exemplary embodiments of the disclosed subject matter;

FIG. 5 schematically illustrates an outline of operations for modifying an application framework devised for network-based telephony to operate in a local telephony, according to exemplary embodiments of the disclosed subject matter.

DETAILED DESCRIPTION

One technical problem dealt with by the disclosed subject matter is utilizing in a local telephony operable via a local base an application framework devised or designed for a network-based telephony. As an example, utilizing an application framework designed for a cellular handset, such as Android, in a handset of a DECT telephony.

The technical problem is intricate due to inherent differences between the two telephonies.

For example, while a cellular handset locally maintains and manages the information such as phone-book contacts and lists of events such as missed calls, a DECT handset receives the information from a local base and has to synchronize the information with the base such as when a new contact number was defined in the DECT base.

Additionally, in a network-based handset the telephony service availability is according to the network status, and in a GSM handset the service availability is also according to the SIM availability. Contrarily, in a DECT handset the telephony service is according to the availability is of the base and the availability of the supporting telephony, such as PSTN or registration of the phone number to a SIP server (a server operating according Signaling Protocol for telephony in VoIP network).

The technical problem is further accentuated when the application framework operating in a DECT handset is required to preserve the original applications support and the look-and-feel thereof.

Furthermore, both basic and complex telephony actions, such as conference, and transfers, should be implemented according to the DECT+CATIQ protocol, which is inherently different from a cellular protocol such as GSM protocol.

It should be noted that It should be noted that the synchronization between local lists of Android and CAT IQ base list is an intricate task, that should calculate various factors, such as:

Complexity of CAT IQ protocol, which notify about a change in the base list, without details about this change, Different type of lists, which have different sorting and different life cycles, for example, contact list can be changed in a base and handsets, missed call list can be added by base only and delete by a handset only, where the list is sorted according to time, Maintaining air communication speed between a base and a handset, Defining a generic, simple and fast protocol between Android and the DECT circuitry in the handset to reduce interactions towards the base, User experience that should be effortless between Android on a cellular handset and Android on a local DECT handset, If the local handset is moving from base to base, different aspects of synchronization should take place.

One technical solution is a local communication device or a local handset operating or interacting with an application framework devised for network-based telephony, where the application framework is adapted to operate or interact with the local communication device or the local handset. Thus is provided a local handset or a part thereof with the original applications support and the user experience of the application framework, at least partially.

In some embodiments the local telephony is a DECT telephony and the local communication device is a DECT device and the local handset is a DECT handset and the local base is a DECT base. In some embodiments, the network-based telephony is a cellular telephony such as a GSM network and the application framework in some embodiments is Android. In some embodiments, the DECT telephony operates via CAT IQ protocol or part thereof.

Optionally, the application framework is modified to preserve the look and feel of the application framework, at least partially. Optionally or additionally, the application framework is also modified to emulate network functionality with respect to the application framework by operations and/or functions of the local base, such as registration or signal strength.

For example, the availability indication of the network towards a network-based handset as presented on application framework such as Android is replaced and emulated according to the availability of a local DECT base and updates that a local handset receive from the DECT base.

It is noted that the solution comprises dividing the operation of a cellular handset to operate as a local handset in coordination with a local base.

To carry out the solution a synchronization algorithm has been devised to combines both online actions and background cycles actions.

A potential technical effect of the disclosed subject matter is a local telephony system with a handset operable, at least partially, as network-based handset.

Another potential technical effect of the disclosed subject matter is a local handset operable with an application framework devised for network telephony and having capabilities of installing and executing applications suited for the application framework.

In the context of some embodiments of the present disclosure, without limiting, a local telephony system, also referred to as a local telephony, implies a telephony system having a limited range such as between about 10 m to about 1000 m. In some non-limiting cases the local telephony system comprises a subset of a telephony system larger than the local telephony system, wherein, without limiting, larger implies having larger range and/or capacity and/or communication rate such a Public Switched Telephone Network (PSTN) or such as the Internet. Thus, a local telephony implies, without limiting, a local based telephony having a local base and one or more local handsets communicable with the local base, where the local based telephony is optionally combined with another network.

In the context of the present disclosure, without limiting, a residence telephony system implies a telephony system having a range about a building or a surrounding thereof.

In the context of the present disclosure, without limiting, a local handset or a plurality thereof and a local base imply components of a local telephony system wherein the local handset or the plurality thereof communicate via the local base. In some non-limiting cases the local base operates a link to a larger telephony system.

In the context of the present disclosure, without limiting, a local handset cooperating with a local base implies that the local handset and the base communicate therebetween according to mutually agreed methods.

In the context of the present disclosure, without limiting, within the local telephony system or within the residence telephony, the local handset communicates with the local base by wireless communications, without precluding any other method of communications.

In the context of the present disclosure, without limiting, a network-based telephony implies a telephony system operating within a network by the resources and/or functionalities of the network, for example, a cellular network, and a network-based handset implies, without limiting, a handset operating within a network by utilizing remote resources and/or functionalities of the network where remote implies, without limiting, having a long rage as opposed to a local or residence range.

In the context of the present disclosure, without limiting, an application framework implies a program and/or a set of programs operating on an apparatus having data processing capabilities, and providing one or more functionalities to the apparatus or an operator thereof and/or providing an environment for the operation of one or more programs. For example, the application framework provides environment for installing applications and/or services to support the applications such as by API.

In the context of the present disclosure, without limiting, an application framework based on an operating system implies an application framework operating on an apparatus by functionalities provided by an operating system such as Windows (Microsoft Corp.) or Linux.

In the context of the present disclosure, without limiting, the term operable or variations thereof imply capable or suitable to operate.

In the context of the present disclosure as related to telephony equipment, without limiting, the terms contact or contacts imply one or more items and/or mechanisms to establish a communication with a related destination.

In the context of the present disclosure, without limiting, the term configured or variations thereof imply designed or implemented or modified, such as by one or more of a program, and/or an electronic circuitry and/or a mechanical element, or a plurality thereof In the context of the present disclosure, without limiting, the term adapting or variations thereof imply modifying such as by one or more of a program and/or an electronic circuitry and/or a mechanical element, or a plurality thereof.

In the context of the present disclosure, without limiting, the term emulate or variations thereof imply providing by a first apparatus and/or program a functionality of second apparatus and/or program, such as by modifying one or more of a program, an electronic circuitry or mechanical element of the first apparatus.

In the context of the present disclosure, without limiting, the term communicatable relates to capability of communication, and the term interactable relates to capability of interaction.

In the context of the present disclosure, without limiting, the term IC chip or chip refers to an integrated circuit, and the term IC chipset, or chipset, refers to a set of integrated circuits that are designed to work together.

For brevity and clarity and without limiting, referring to an operation in the present form past form or other forms implies additionally or alternatively a potential operation, for example, communicating implies additionally or alternatively operable or capable of communicating.

For brevity and clarity and without limiting, in the present disclosure a handset denotes a user-operable communication apparatus such as a telephone handset or smart phone, but without precluding other apparatus such as a personal information manager (PIM), a tablet computer, a laptop computer or a desktop computer.

For brevity and clarity and without limiting, the term user is used interchangeably with the term operator, denoting an operator or a potential operator of an apparatus.

In the following description and respective drawings, unless otherwise specified, a local telephony system is exemplified by a DECT (Digital Enhanced Cordless Telecommunications) system having a local base exemplified by a DECT base and at least one or a plurality of local handset as a DECT handset utilizing one or more circuitries devised for a DECT communications, without limiting or precluding any other local system having any other local base and at least one of any other local handset. The one or more circuitries devised for a DECT communications, such as a DECT chip or a DECT chipset, is also referred to as a DECT device.

In the following description, unless otherwise specified, a network-based handset is exemplified by a GSM cellular handset and an application framework devised for network-based telephony is exemplified by Android, without limiting or precluding any other network-based handset nor any network nor any application framework.

It is noted that, at least in some embodiments, the SIM (Subscriber Identity Module) is missing in or removed from the handset and the interaction with the SIM is emulated as a part of adapting the application framework devised for network-based telephony. Furthermore, in some embodiments, emulating the SIM comprises a part of adapting, or modification, of the application framework to interact with a DECT device.

Without limiting, a guideline or outline for modifying, at least partially, devised for network-based telephony to operate in a DECT telephony comprises:

Abstracting phone features of GSM, by corresponding DECT operations, possibly or preferably in a Radio Interface Layer Emulating GSM by DECT events, such a network management, cell management, SIM management, data calls or conference management Using generic Android GUI for DECT calls Supporting different streams and analog front end (AFE)

Using generic Android functionality also for DECT

Enabling future Telephony android applications to fit DECT calls

Enabling upgrading of Android.

Without limiting, some DECT properties or features that are lacking in GSM and/or Android and that have to be emulated or supported, at least partially, comprise:

Handset number and/or name

Current base number

Delayed caller ID such as updating call details during a live call

Missed calls such as synchronizing the local base a missed call list where an optional additional handset may answer the call A voice mail indications from the local base A date/time synchronization by the local base Intercom calls between a plurality of the application framework in one or more of local handsets Page calls deflect calls intrude calls Base voice mail calls A post dialing Special digits, such as 'Flash'.

PSTN line waiting calls

Some other call features, such as 'line select', 'call forward'

Contact lists or call log lists that are stored in the local base

Handset settings, such as registration to one or more bases, synchronization to other bases Base setting such as base reset, deregistration of a local handset from a base, base parameters such as rings or dialing.

It should be noted that DECT may be modified in the future. For example, DECT may be enabled to operate on the Internet as VoIP where some network features currently lacking in DECT but supported by GSM may be supported or enabled later on in DECT, at least partially.

It is noted that the modification comprises dividing the operation of a cellular handset such as GSM or CDMA to operate as a local DECT handset in coordination with a local DECT base.

A general non-limiting overview of practicing the present disclosure is presented below. The overview outlines exemplary practice of embodiments of the present disclosure, providing a constructive basis for variant and/or alternative and/or divergent embodiments, some of which are subsequently described.

Reference to previously presented elements is implied without necessarily further citing the drawing in which they appear.

In some embodiments of the disclosed subject matter is provided a method for modifying an application framework devised for network-based telephony to operate in a local telephony.

In some embodiments, the application framework devised for network-based telephony is an application framework devised for cellular telephony, such as GSM or a CDMA cellular telephony. For example, an Android application framework, yet not precluding other application frameworks or part thereof, such as Symbian (Symbian Foundation) or Windows Phone (Microsoft Corp.). In some cases, the application framework is based on and/or supported by and/or enabled by an operating system such as Linux.

In some embodiments, the method comprises adapting the application framework to interact with a communication device operable cooperatively with a local base, the communication device also referred to as a local communication device. In some embodiments, the local communication device is operable in a DECT network, such as according to a CAT IQ protocol or part thereof, as a part of a DECT handset.

In some embodiments, adapting comprises modifying some parts of the application framework and/or adding parts to the application framework to enable the application framework to communicate with a local base via a communication device operable cooperatively with a local base.

In some embodiments, the method further comprises emulating a functionally of the network or the network-based telephony related to the application framework according to an operation of the local base, at least partially. In some embodiments, the emulation comprises operation such as modifying some parts of the application framework and/or adding parts to the application framework. For example, registration of a GSM subscriber to the cellular network and/or cellular provider is emulated by registration to the local base by the modified application framework, or the signal strength of a GSM is emulated based on the signal strength of the local base.

It is noted that in some embodiments, adapting the application framework comprises preserving a functionality of the application framework, at least partially, such as by preserving at least one of a dialing, a textual user interface, a graphical user interface, a graphical interaction, a textual interaction, a voice rendering, a sound rendering, a data transmission, a data reception, or any combination thereof.

For example, in some embodiments, adapting the application framework comprises, at least partially:

modifying a contact functionality to support distinctive contact functions of the application framework according to at least one of the local base or a local handset or a combination thereof, modifying a communication functionality to support distinctive communication functions of the application framework, modifying a functionality of interactions between at least one of the application framework to support distinctive interactions between a plurality of the application framework and a plurality of local handsets, modifying dialing to support a dialing functionality of the application framework, modifying voice streaming to support a voice streaming functionality of the application framework, modifying data transmit/receive to support a data communication functionality of the application framework, modifying the contact functionality to support sharing among a plurality of local handsets of contacts stored in the local base, modifying the communication functionality to support paging at least one of local handset, modifying the communication functionality to support intercom interaction between a plurality of the application framework in one or more of local handset, modifying the communication functionality to support multi-lines, adding a support for at least one of a number of the local handset, a name of the local handset, a current number of the local base, a delayed Caller ID, a synchronization with missed call list of the local base, a voice mail, a Post Dialing, special digits of the application framework, synchronization of missed call list of the local base, a voice mail, a Post Dialing with a plurality of local bases, each local base at a time, configuring the application framework to operate in the local handset, a registration to at least one of the local base, a synchronization with one or more of a local base, configuring the local base, or any combination thereof, modifying a date-time functionality with a synchronization by and from the local base, a de-registration of the local handset, a deregistration of another local handset on same local base, received signal strength indication, or any combination thereof.

As another example, in some embodiments, emulating comprises at least partially at least one of:

emulating a subscriber identification module, emulating at least one of a message sending or a message retrieval via the local base, emulating a signal strength by a received signal strength indicator of the local base, emulating at least one or a waiting call, a call hold, a call transfer or a combination thereof, emulating a Cell management, emulating cellular network management, at least partially, emulating a call log in at least one of the local base or a local handset or a combination thereof, emulating a conference management, at least partially, or any combination thereof.

In some embodiments, the modified application framework devised for network-based telephony is installed and/or integrated in a handset thereby providing a local handset operable in a local telephony, optionally together with one or more handsets of the local telephony while sharing a local base. In some embodiments, the one or more handsets of the local telephony employ a modified framework devised for network-based telephony and/or, optionally, the one or more handsets of the local telephony employ different software or circuitry such as originally devised for the local handset. Optionally, the handset employing the modified application framework is operable in the local telephony together with a plurality of handsets where a handset either employs a modified application framework or a different software or circuitry such as originally devised for the local handset.

In some embodiments of the disclosed subject matter is provided an apparatus for a local telephony, comprising an at least a part of a local handset employing an application framework devised for network-based telephony and adapted to interact with a local base, where, optionally, the local telephony system is a DECT system.

In some embodiments, the apparatus further comprising a local base, where, in some embodiments, a functionally of the application framework devised for network-based telephony is emulated according to an operation of the local base, at least partially.

In some embodiments, the network-based telephony is a cellular telephony, optionally a GSM or a CDMA telephony.

In some embodiments, the at least a part of the local handset is a device communicatable with the local base, such as a DECT device as optionally a DECT chip or DECT chipset.

In some embodiments, the at least a part of the local handset comprises a processor and storage medium for storing the application framework or part thereof as a program executable by the processor. Optionally or additionally, the at least a part of the local handset comprises one or more electronic circuitries to support operation of the adapted application framework.

In some embodiments, the application framework devised for network-based telephony is adapted to preserve a functionality of the application framework devised for network-based telephony, at least partially, and optionally, the application framework devised for network-based telephony is Android.

In some embodiments, adapting the application framework to preserve a functionality of the application framework devised for network-based telephony comprises preserving at least one of a dialing, a textual user interface, a graphical user interface, a graphical interaction, a textual interaction, a voice rendering, a data transmission, a data reception, or any combination thereof.

In some embodiments, the at least a part of a local handset comprises a local communication device, such as a DECT device operable cooperatively with a DECT base. Optionally, the at least a part of a local handset comprises a local handset installed with an application framework devised for network-based telephony where the application framework is modified to operate with the local communication device and interact with a local base via the local communication device.

In some embodiments, the at least a part of the local handset, optionally as a local handset, further comprises a device operable in a network, such a cellular communication circuitry or a cellular communication device, also referred to as a network communication device. The application framework is modified while preserving, at least partly, the original functionality thereof, enabling the application framework to interact with the network communication device while allowing coexistence and operation of both a network communication, such as cellular communication, and a local communication with the local base. Optionally, the network communication device is a cellular device operable in a cellular network and where, optionally, the network device is a GSM device operable in a GSM network.

In some embodiments, the at least a part of a local handset comprises a cellular handset, or other network-based handset, altered to operate with a modified application framework devised for network-based telephony. The cellular handset is altered such as by removing the network communication device to accommodate a local communication device and/or the cellular handset altered to allow coexistence and operation of both a cellular communication and local communication with a local base, where the application framework is modified to operate with the local communication device and/or both the local communication device and the network communication device, respectively.

FIG. 1A schematically illustrates a hierarchy block diagram 100 of Android. An operating system 108 provides interface to some hardware components and provides support for other software components and/or programs. A library layer 106 provides services for various operations and application framework 104 provides a framework or environment for applications and/or software components in applications layer 102. Within library layer 106 is provided run-time set of software components providing, in some cases, services to particular hardware and operations that may be shared by applications and/or application framework components.

FIG. 1B schematically illustrates a partial block diagram and basic control sequence of Android for phone operations. In application framework 104 a phone module or component 112 provides phones services to applications, for example, accepting a destination phone number for setting up a phone call. Phone component 112 interacts with a radio interface layer 114, referred to also as RIL, where RIL is an interface layer for general phone operations and connections between Android and radio hardware. The actual interactions with a specific hardware, a module or a component comprising a construct akin to socket or plug-in interface is provided as a vendor RIL 118 which interacts with phone hardware and/or activates actual phone operations with the specific hardware, optionally via service of operating system 108.

Within library layer 106 a radio daemon 116, referred to also as RILD, provides abstract network-based phone services and/or an envelope providing a main process for RIL, where, in some cases, the RILD is a part of RIL. For actual interactions with a specific hardware, a module comprising a construct akin to socket or plug-in interface is provided as a vendor RIL 118 which interacts with phone hardware and/or activates actual phone operations with the specific hardware, optionally via service of operating system 108.

For example, RILD initializes the vendor RIL 118, processes communication from Android telephony services, and dispatches calls to vendor RIL 118 as solicited commands, and for example, vendor RIL 118 processes communication with phone hardware and dispatches calls to the RILD through unsolicited commands.

FIG. 2 schematically illustrates a part of Android with some of the elements used in adaptation of Android and relations therebetween, according to exemplary embodiments of the disclosed subject matter. The dashed boxes indicate some of the software components added as a part of modification Android to operate in a local DECT handset or part thereof, and the dashed half-boxes within a rectangle indicate partial modification of the respective box as a part of modification Android to operate in a local DECT handset or part thereof.

The description below with respect to FIG.FIG. 2 provides, at least principally and without limiting, an example how to modify a part or a facet of Android to operate in a DECT telephony In applications layer 102 a phone application 202 manages the phone operation from the user point of view, such as getting a phone destination number, and interacts with a telephony manager 208. Telephony manager 208 on the other hand interacts with vendor RIL 118 which is a radio interface layer 114 modified and/or programmed for DECT operation.

Vendor RIL 118 comprises two parts; one part is for general phone operations denoted as G-RIL 226, and the other part for specific DECT operations denoted as D-RIL 228. Optionally, G-RIL 226 and D-RIL 228 interacts therebetween.

In some embodiments, vendor RIL 118 operates according to particular settings for DECT set up in a software component or application in applications layer 102, as a DECT settings module 204, that interacts with DECT manager 212 in application framework 104. DECT manager 212 operates in parallel with telephony manager 208 which, in some embodiments, is also partially modified for DECT operation. Generally, vendor RIL 118 or particularly G-RIL 226 interact with telephony manger 208 by Android events, and vendor RIL 118 or particularly D-RIL 228 and interact with DECT manager 212 via DECT events Vendor RIL 118, incorporating therein the RILD, interacts with a software component or program as DECT services component 216 that counterparts the Vendor RIL 118. DECT services component 216 eventually interacts with and activates a local communication device, exemplified as a DECT device 220, that accomplishes the call or other operations, either directly or indirectly such as via operating system 108.

In some embodiments, in applications layer 102 a software component or application for of Android notifications, denoted as notifications 206, is at least partially modified for DECT notifications, providing indications such as DECT handset identification of delayed caller ID.

It is noted that in Android the application layer and application framework operate according to Java (Sun Microsystems, Inc.), whereas the lower levels operate according to the C language. Thus, a translator between Java and C and between C and Java is provided and used for adapted components if required, such as for vendor RIL 118.

DECT manager 212 performs, for example, tasks as:
  Get DECT events from DECT RIL
  Processing responsive to events, if required
  Keep information needed for operation in a DECT telephony, such as Base number or DECT handset number, associated lines of the base to the handset or handsets
  Notify applications waiting fro the event
Some functions of DECT manager 212 are, for example:
  Get requests from Applications and from other managers
  If a request can be answered by DECT manager 212 then respond immediately, otherwise generate event to vendor RIL 118
Some of the tasks of vendor RIL 118 are:
  Listen for requests from two different sockets from Java, namely, the original Android GSM RIL socket and a new socket for DECT services towards DECT manager
  Read parameters of a request
  Identify the request
  Send relevant data to a corresponding function of D-RIL 228
  Build a text message according to DECT telephony protocol
  Send to DECT services component 216
When a response arrives from a socket in DECT services component 216 an exemplary respond includes:
  Parse text message
  If required, update RIL flags and call state
  According to the message send appropriate response to Java, either via an original Android RIL socket or to DECT manger 212 via a socket in DECT services component 216

A substantially handy functionally of a handset from the user point of view is contacts management, such as retrieving contacts for review or dialing. In Android the contacts are retrieved by a software components or program that connects via a protocol with the contacts storage such as SIM and/or the handset, collectively considered as a database of GSM. On the other hand, in DECT the contacts are stored, at least partially, in the DECT base, collectively considered as DECT database. Particularly, at least in some cases, the contacts protocol is SQL-lite which is a subset of the industry standard SQL (Structure Query Language).

Thus, for adapting Android to operate in a DECT telephony, contacts component 222 as an application or a software component queries a list provider 224 by the protocol where list provider 224 interprets the queries and translate them to appropriate DECT queries. The queries are typically sent, via D-RIL 228 and DECT services component 216 to DECT device 220 which sends the queries to the local base which returns the requested contacts via DECT device 220. The returned contacts are returned via DECT services component 216 and D-RIL 228 to list provider 224 which provides the contacts to contacts component 222 according to the protocol. In case the contacts, or part thereof, are stored in the handset and list provider 224 access the contacts in the handset and provides the contacts to contacts component 222 according to the protocol, optionally with contacts retrieved from the local base. It is noted that the operation relative to DECT database are transparent with respect to the application level, such as contacts component 222.

Generally list provider 224 handles lists such as of phone number or phone contacts or missed calls or incoming calls or outgoing calls as, for example, by interrogating the local base.

Some exemplary operations of list provider 224, as modified for DECT, are:
  Get database request from an application such as contacts component 222
  QUERYBASE—request the DECT database, such as the local base, a list of contacts and related fields or parameters
  GETBASE—read parameters of a contact entry or a list of contact entries
  SETBASE set values of contact entry and related fields in DECT database
  DELETE—delete an entry from DECT database or deleted a list of contact entries from DECT database In some embodiments, the application framework devised for network-based telephony is modified to operate with a local communication device providing a local handset of a part thereof. Optionally or alternatively, the application framework is modified to operate with a local communication device while preserving the original functionality allowing the modified application framework to operate both or either of the local communication device and the network, where the network may be a cellular network such as a GSM network.

FIG. 3 schematically illustrates a local handset or part thereof 310 comprising a local communication device, exemplified as a DECT device 220, and a modified application framework 302, exemplified as Android, modified to operate with the local communication device, according to exemplary embodiments of the disclosed subject matter.

In some embodiments, the application framework is modified to support interaction with a local communication device while preserving, at least partially, the original functionality thereof. Optionally, the original functionality comprises also interaction with a network device such as a cellular communication device.

It is noted that DECT device 220 is not necessarily a DECT handset but, rather, one or more circuitries devised for a DECT communications.

In some embodiments of the disclosed subject matter is provided a kit comprising a device enabling cooperative communications with a local base, such a local communication device for example, exemplified as a DECT device. The kit further comprises an application framework devised for network-based telephony, such as Android, where the application framework is adapted to interact with the local base by the device, thereby enabling to construct a local handset or part thereof.

In some embodiments, the device is operable as at least a part of a DECT handset operable with a local DECT base, optionally enabling cooperative communications with a local base according to a CAT IQ protocol or part thereof In some embodiments, the device is formed or provided, at least partially, as one of an IC chip, an IC chipset, or a circuitry comprising at least one IC chip.

In some embodiments, the application framework is devised for a cellular telephony, optionally as a GSM telephony, where, optionally, the application framework is Android.

In some embodiments, the device and the application framework are combined or integrated. Optionally, the application framework maintains the functionality of operation with a cellular device such as a cellular communications or network device.

In some embodiments, the kit comprises instructions for combining the device and the application framework to operate as at least a part of a local handset communicable with the local base. Optionally, the instructions and/or the application framework are provided as an at least one of a computer readable medium or a reference for downloading from a remote storage apparatus.

In some embodiments, each and/or any of the items of the kit is provided as a plurality of the respective item.

FIG. 4 schematically illustrates a kit 410 comprising a local communication device, exemplified as DECT device 220, and a modified application framework 302 operable with the local communication device, the application framework exemplified as Android, according to exemplary embodiments of the disclosed subject matter. Dashed line 404 and dashed line 402 indicate optional plurality of the local communication device and/or plurality of modified application framework, respectively.

In some embodiments, the application framework is modified to support interaction with a local communication device while preserving, at least partially, the original functionality thereof. Optionally, the original functionality comprises also interaction with a network device such as a cellular communication device.

In some embodiments, the application framework is modified to support interaction with a local communication device while preserving, at least partially, the original functionality thereof. Optionally, the original functionality comprises also interaction with a network device such as a cellular communication device.

It is noted again that DECT device 220 is not necessarily a DECT handset but, rather, one or more circuitries devised for a DECT communications.

FIG. 5 schematically illustrates an outline of operations for modifying an application framework devised for network-based telephony to operate in a local telephony, according to exemplary embodiments of the disclosed subject matter.

In some embodiments, the application framework is originally devised or configured to operate in a GSM cellular network such as in a GSM handset, for example, an Android application framework intended to use a SIM in a GSM cellular network.

At 502 the application framework is adapted, or modified, to interact with a communication device operable cooperatively with a local base. For example, a local communication device operable with a local base such as a DECT device operable cooperatively with a local DECT base in a local DECT telephony.

At 504 the application framework is further modified by emulating, at least partially, a functionally of the network related to the network-based handset according to an operation of the local base such as emulating interactions of the local base to appear and/or to be perceived at the modified handset as interactions or indications of the network. For example, the signal strength of the local base is emulated to appear as the signal strength of the network.

In some embodiments, the application framework is adapted such as to preserve functionally with respect to the network, such as to operate with a network communication device, for example, a GSM cellular device with a SIM.

Optionally, the application framework maintains the functionality of operation with a cellular device such as a cellular communications or network device. For example, the application framework is modified to allow coexistence and operation both with a local communication device and network communication device to operate in a local network such as DECT, and network such as GSM or CDMA, respectively.

It is noted that according to the present disclosure, operating systems and/or application frameworks for mobile applications, and potentially future developments thereof, may be adapted to operate in a local telephony, providing a local handset or a part thereof with capabilities of the operating systems and/or application frameworks for mobile applications. For example, providing a DECT handset with capabilities of an Android application framework, presenting to the user the Graphical User Interface (GUI) of Android and enabling the DECT handset to install and launch applications designed for Android.

It is also noted that, according to the present disclosure, operating systems and/or application frameworks for mobile applications may be adapted for other telephonies rather than a local telephony. For example, paging systems, intercom systems or alarm systems.

The flowchart and block diagrams illustrate an architecture, a functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated operations may occur in deferent order or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terminology used herein is for the purpose of describing particular embodiments only and is not intended to be limiting of the disclosed subject matter. While certain embodiments of the disclosed subject matter have been illustrated and described, it will be clear that the invention is not limited to the embodiments described herein. Numerous modifications, changes, variations, substitutions and equivalents are not precluded.

The terminology used herein should not be understood as limiting unless otherwise specified.

What is claimed is:

1. A method for modifying an Android application framework devised for a network-based telephony to operate in a local telephony, comprising:

adapting the Android application framework to interact with a communication device operable cooperatively with a local Digital Enhanced Cordless Telecommunications (DECT) base by adding a DECT manager to the Android application framework; wherein the DECT manager is arranged to interact with a DECT radio interface laver (RIL) of the library layer to process responses to DECT events; wherein a telephony manager of the application framework is arranged to interact with a general phone operations by Android events; and emulating a functionality of the network-based telephony related to the Android application framework according to an operation of the local DECT base, at least partially; and wherein the communication device is operable as at least a part of as a DECT handset operable with the local DECT base.

2. The method according to claim 1, wherein operable cooperatively with the DECT local base comprises operable according to a Cordless Advanced Technology internet and quality (CAT IQ) protocol or a part thereof.

3. The method according to claim 1, wherein adapting the Android application framework comprises preserving a functionality of the Android application framework, at least partially.

4. The method according to claim 1 wherein the DECT RIL of the library layer is arranged to operate according to DECT settings set up in a DECT setting module of an applications layer.

5. The method according to claim 1, wherein adapting the Android application framework comprises, at least partially, at least one of: modifying a contact functionality to support distinctive contact functions of the Android application framework according to at least one of the local base or a local handset or a combination thereof, modifying a communication functionality to support distinctive communication functions of the Android application framework, modifying a functionality of interactions between at least one of the Android application framework to support distinctive interactions between a plurality of the Android application framework and a plurality of local handsets, modifying dialing to support a dialing functionality of the Android application framework, modifying voice streaming to support a voice streaming functionality of the Android application framework, modifying data transmit/receive to support a data communication functionality of the Android application framework, modifying the contact functionality to support sharing among a plurality of local handsets of contacts stored in the local base, modifying the communication functionality to support paging at least one of local handset, modifying the communication functionality to support intercom interaction between a plurality of the handset, where at least one handset having an Android application framework, modifying the communication functionality to support multi-lines, adding a support for at least one of a number of the local handset, a name of the local handset, a current number of the local base, a delayed Caller identification (ID), a synchronization with missed call list of the local base, a voice mail, a Post Dialing, special digits of the application framework , configuring the Android application framework to operate in the local handset, synchronization of missed call list of the local base, a voice mail, a Post Dialing with a plurality of local bases, a registration to at least one of the local base, a synchronization with one or more of the local base, configuring the local base, or any combination thereof, modifying a date-time functionality with a synchronization by and from the local base, a de-registration of the local handset, a deregistration of another local handset on same local base, received signal strength indication, or any combination thereof.

6. The method according to claim 1, wherein emulating comprises at least partially at least one of: emulating a subscriber identification module, emulating at least one of a message sending or a message retrieval via the local base, emulating a signal strength by a received signal strength indicator of the local base, emulating at least one or a waiting call, a call hold, a call transfer or a combination thereof, emulating a Cell management, emulating cellular network management, at least partially, emulating a call log in at least one of the local base or a local handset or a combination thereof, emulating a conference management, at least partially, or any combination thereof.

7. An apparatus for a local telephony, comprising an at least a part of a local handset employing an Android application framework devised for a network-based telephony and adapted to interact with a local base; wherein the Android application framework comprises a Digital Enhanced Cordless Telecommunications (DECT) manager; wherein the DECT manager is arranged to interact with a DECT radio interface layer (RIL) of the library layer to process responses to DECT events; wherein a telephony manager of the application framework is arranged to interact with a general phone operations by Android events; wherein the local telephony is a DECT system.

8. The apparatus according to claim 7, wherein the DECT RIL of the library layer is arranged to operate according to DECT settings set up in a DECT setting module of an applications layer.

9. The apparatus according to claim 7, wherein the Android application framework devised for the network-based telephony is adapted to preserve a functionality of the application framework devised for the network-based telephony, at least partially.

10. The apparatus according to claim 9, adapted to preserve the functionality of the Android application framework devised for the network-based telephony comprises preserving at least one of a dialing, a textual user interface, a graphical user interface, a graphical interaction, a textual interaction, a voice rendering, a data transmission, a data reception, or any combination thereof.

11. The apparatus according to claim 7, wherein a functionality of the network-based telephony related to the Android application framework devised for the network-based telephony is emulated according to an operation of the local base, at least partially.

12. The apparatus according to claim 7, wherein the at least the part of the local handset further comprises a network device operable in a network and wherein the Android application framework devised for the network-based telephony interacts with the network device.

13. The apparatus according to claim 7, wherein the at least part of the local handset is adapted to interact with the local base according to a Cordless Advanced Technology—internet and quality (CAT IQ) protocol or a part thereof.

14. The apparatus according to claim 7, wherein the Android application framework is modified to operate with the local base while preserving a functionality of the Android application framework, at least partially.

15. The apparatus according to claim 7, wherein the Android application framework is modified to operate with the local base while preserving the functionality of the Android application framework, by at least one of preserving the functionality of the Android application framework comprises preserving at least one of a dialing, a textual user interface, a graphical user interface, a graphical interaction, a textual interaction, a voice rendering, a sound rendering, a data transmission, a data reception, or a combination thereof.

16. A kit comprising: a local communication device that enables cooperative communications with a local base; and an Android application framework devised for network-based telephony and adapted to interact with the local base by the local communication device; wherein the Android application framework comprises a Digital Enhanced Cordless Telecommunications (DECT) manager; wherein the DECT manager is arranged to interact with a DECT radio interface layer (RIL) of the library layer to process responses to DECT events; wherein a telephony manager of the application framework is arranged to interact with a general phone operations by Android events; wherein the local communication device is operable as at least a part of a DECT handset operable with a local DECT base.

17. The kit according to claim 16, wherein the local communication device is arranged to perform cooperative communications with the local base according to a Cordless Advanced Technology internet and quality (CAT IQ) protocol or a part thereof.

18. The kit according to claim 16, wherein the DECT RIL of the library layer is arranged to operate according to DECT settings set up in a DECT setting module of an applications layer.

19. The kit according to claim 16, wherein the local communication device and the application framework are integrated.

20. The kit according to claim 16, wherein the application framework maintains a functionality of operation with a cellular device, at least partially.

21. The kit according to claim 16, further comprising instructions for combining the local communication device and the application framework to operate as at least a part of a local handset communicable with the local base.

22. The kit according to claim 16, wherein the Android application framework is modified to operate with the local base while preserving a functionality of the Android application framework, at least partially.

23. The kit according to claim 16, wherein the Android application framework is modified to operate with the local base while preserving the functionality of the Android application framework, by at least one of preserving the functionality of the Android application framework comprises preserving at least one of a dialing, a textual user interface, a graphical user interface, a graphical interaction, a textual interaction, a voice rendering, a sound rendering, a data transmission, a data reception, or a combination thereof.

24. A kit comprising an Android application framework devised for a network-based telephony and adapted to operate in a local telephony; wherein the local telephony is Digital Enhanced Cordless Telecommunications (DECT) telephony; wherein the Android application framework comprises a DECT manager; wherein the DECT manager is arranged to interact with a DECT radio interface layer (RIL) of the library layer to process responses to DECT events; wherein a telephony manager of the application framework is arranged to interact with a general phone operations by Android events.

25. The kit according to claim 24, wherein the kit is provided as an at least one of a computer readable medium or a reference for downloading from a remote storage apparatus.

26. The kit according to claim 24, further comprising instructions for employing the Android application framework as at least a part of a local handset communicable with a local base.

27. The kit according to claim 24, wherein the local communication device is arranged to perform cooperative communications with the local base according to a Cordless Advanced Technology internet and quality (CAT IQ) protocol or a part thereof.

28. The kit according to claim 24, wherein the DECT RIL of the library layer is arranged to operate according to DECT settings set up in a DECT setting module of an applications layer.

29. The kit according to claim 24, wherein the Android application framework is modified to operate with the local base while preserving a functionality of the Android application framework, at least partially.

30. The kit according to claim 24, wherein the Android application framework is modified to operate with the local base while preserving the functionality of the Android application framework, by at least one of preserving the functionality of the Android application framework comprises preserving at least one of a dialing, a textual user interface, a graphical user interface, a graphical interaction, a textual interaction, a voice rendering, a sound rendering, a data transmission, a data reception, or a combination thereof.

* * * * *